US007550289B2

(12) United States Patent
Cheng et al.

(10) Patent No.: US 7,550,289 B2
(45) Date of Patent: Jun. 23, 2009

(54) METHOD OF FABRICATING AN ENTEGRAL DEVICE OF A BIOCHIP INTERGRATED WITH MICRO THERMO-ELECTRIC ELEMENTS AND THE APPARATUS THEREOF

(75) Inventors: Jen-Hau Cheng, Taipei (TW); Chun-Kai Liu, Taipei (TW)

(73) Assignee: Industrial Technology Research Institute (TW)

( * ) Notice: Subject to any disclaimer, the term of this patent is extended or adjusted under 35 U.S.C. 154(b) by 600 days.

(21) Appl. No.: 11/215,565

(22) Filed: Aug. 29, 2005

(65) Prior Publication Data

US 2006/0216815 A1 Sep. 28, 2006

(30) Foreign Application Priority Data

Mar. 25, 2005 (TW) .............................. 94109368 A

(51) Int. Cl.
*G01N 15/00* (2006.01)

(52) U.S. Cl. ......................... 435/287.2; 435/36; 422/50

(58) Field of Classification Search .............. 435/287.2, 435/36; 422/50

See application file for complete search history.

(56) References Cited

U.S. PATENT DOCUMENTS 5,525,300 A 6/1996 Danssaert et al. ............. 422/99
5,939,312 A 8/1999 Baier ...................... 435/287.2
2003/0064507 A1* 4/2003 Gallagher et al. ........ 435/287.2
2004/0038228 A1* 2/2004 Verhaegen ..................... 435/6
2004/0096831 A1* 5/2004 Hughes ......................... 435/6
2005/0009101 A1* 1/2005 Blackburn .................. 435/7.1
2006/0216815 A1* 9/2006 Cheng et al. ............. 435/287.2
2007/0197138 A1* 8/2007 Montierth et al. ............. 451/36
2007/0207707 A1* 9/2007 Montierth et al. ............. 451/36
2007/0207710 A1* 9/2007 Montierth et al. ............. 451/56

* cited by examiner

*Primary Examiner*—Laura M Menz
(74) *Attorney, Agent, or Firm*—Stout, Uxa, Buyan & Mullins, LLP

(57) ABSTRACT

A method of fabricating an integral device of a biochip integrated with micro thermo-electric elements and the apparatus thereof is disclosed. The micro thermo-electric biochip includes a micro thermo-electric temperature control unit and a biochip unit, and both of the two units can be manufactured by using the fabricating method. In addition, the biochip unit can be attached to the bottom side of the micro thermo-electric temperature control unit, and it can also be integrated into the micro thermo-electric temperature control unit. Besides, the integral device includes disposable type and non-disposable type.

11 Claims, 8 Drawing Sheets

METHOD OF FABRICATING AN ENTEGRAL DEVICE OF A BIOCHIP INTERGRATED WITH MICRO THERMO-ELECTRIC ELEMENTS AND THE APPARATUS THEREOF

BACKGROUND OF THE INVENTION

1. Field of the Invention

The present invention relates to a method of fabricating an integral device of a biochip and the apparatus thereof, especially relates to a method of fabricating an integral device of a biochip integrated with micro thermo-electric elements and the apparatus thereof.

2. Description of the Prior Art

The polymerase chain reaction (PCR) was invented by Kary Mullis at 1985. The PCR is an artificial copy technique simulated and simplified from the idea of the Deoxyribonucleic Acid (DNA) replication. The PCR can exactly increase the weight of the specific interval of the DNA at very short time in the test tube and the weight of the original DNA is increased from few picograms to few micrograms even to few milligrams. Because of the increase of the signal, an easy and fast method is provided to detect the virus, breed the DNA, diagnosis the disease and identify by the legal medical expert.

The following is the description of the theory and the method of the PCR. At first, the DNA template is heated to 95 centigrade degrees. When the DNA of the double helix will be split into two strands, the step is called the denaturation. Then, the temperature of the test tube will go down to 65 centigrade degrees and the primer pair and the single strand DNA start to stick together. The step is called annealing. Finally, the temperature will increase to 75 centigrade degrees and the compound enzyme of the DNA can duplicate the single strand DNA, which is stuck with the primer pair, at the range of the suitable temperature. At the time, the gene chain, which is formed in the previous step, can be extended and this step is called extension. After the three steps described above, it is called a cycle. Those steps repeat again and again, and the product can be rapidly produced at the speed of 2N.

The introduction of the circulated steps described above, it is known that the reaction of the PCR need to do the temperature control by increasing or decreasing the temperature. Therefore, the range of the temperature control is the key point for the reaction of the PCR. It should avoid increasing the temperature too high for the normal type of the DNA, and the DNA would be damaged by the higher temperature and the probability of the error of the duplication can be increased. On the other hand, if the temperature of the cycle is too low, such as the step of the denaturation, the temperature reaction is lower than 95 centigrade degrees, the two strands DNA cannot be split into single. And the following steps cannot be completed. Therefore, the temperature control is very important for the PCR reaction.

Those PCR machine sold in the market, the management of the temperature control can use the following methods: Peltier device, resistive/water, light, electric coil/air, circulating air and so on. In the comparison of the speed of increasing the temperature, there is no big different among those methods described above. However, in the comparison of the speed of decreasing the temperature, the Peltier device can automatically decrease the temperature without using additional materials, such as water or air. Because of this, the Peltier device is become the main stream in the market.

It is the research trend to minimize the PCR reaction. The minimization solve many drawbacks, such as big volume, heavy machine, big operative power, and large value of the reactive reagent, and increase the cycle reaction time of the PCR. The conventional micro PCR reaction includes two of the following types: (1) chamber-type PCR, and (2) continuous-flow PCR. The method to increase or decrease the temperature of the micro PCR described above is using the metal wire to heat, wherein the chamber-type PCR is using the metal wire to heat the wall of the chamber and then transfer it from the chamber to the reactive fluid. By switching the temperature of the chamber high or low, the three temperature ranges can be reached by the reactive need PCR. Controversy, the continuous-flow PCR is directly heating the fluid from the bottom, and the density of the metal wire is used to achieve the three temperature ranges of the reaction. These two methods described above to decrease the temperature are using the convection air to cool down. Besides, there are a few related researches produced reactive continuous channel and chamber, and dispose a Peltier device below the reactive continuous channel and the chamber that is used to be the tool to increase or decrease the temperature. The temperature produced by the Peltier device is transferred to the adherent material from the backboard of the Peltier device and to the continuous channel and the material of the reactive room then transfer to the reactive fluid.

Most of the PCR device used to increase or decrease the temperature is the Peltier device. For example, there are four different temperature ranges can be used to heat up or down by the Peltier device to have different temperature reaction. When the heated range is achieved the temperature of the need, the rotated device can be used to move the reactive reagent to the temperature range of the need. Besides, in the micro PCR chip, the Peltier device can be directly stuck in the back of the PCR chip to be the cooler for increasing or decreasing the temperature. In another prior art, the micro chamber-type PCR is used. And the metal wire and the air are used to decrease the temperature for the need of the chamber-type PCR. The size of the chamber-type PCR is used to adjust and control the value of the reactive reagent. The design of the double side metal membrane heater is used to control the temperature more easily. Besides, in another prior art, the micro chamber-type PCR utilizes the method of pressurizing fabrication to fabricate the chamber-type PCR, thermo-electric elements, heat dissipation fin, chamber covered into one unity. The chamber is made by slim material to reduce the value of the reagent and is using the thermoelectric element, which is stuck in the bottom of the chamber, to control the temperature.

SUMMARY OF THE INVENTION

Base on the prior art described above, there are a lot of problems in the polymerase chain reaction (PCR), such as big volume, heavy weight, high output of the operative power, and large value of the reagent. One of the purposes of the present invention is to utilize the micro electrical, semiconductor, and fine mechanical processing to fabricate large amount of concaves, which is used to put thermo-electric materials, in the substrate. The contact resistance is reduced and the integral efficiency is increased by increasing the contact area between the concave and the thermo-electric material. In order to enhance the integral of the micro thermo-electric device in the biochip and the light communication module, the silicon substrate micro electrical processing technique is used to help the micro thermoelectric device integrate in the application.

Besides, instead of using concave to put the thermo-electric material and integrate the PCR chip, another embodiment of the present invention can fabricate the non-concave micro thermo-electric PCR biochip. In addition, the concave and the non-concave micro thermo-electric PCR biochip can be used to fabricate the disposable or non-disposable, and provide more stable, fast, accurate and convenient examined method.

Therefore, the present invention provides a method and apparatus to integrate the PCR reactive chip with the micro thermo-electric element. The PCR reactive chip can be integrated and produced in the micro thermo-electric temperature control unit to reduce the transferred time of heat, reduce the contact area of the thermal resistance, increase the accuracy of the temperature control, and satisfy the need of the temperature control of the PCR chamber. A few of micro thermo-electric temperature control units and the temperature control units can be combined to process the control of the different temperature ranges.

According to previous description, the method of fabricating a biochip integrated with micro thermoelectric elements and the apparatus thereof comprises at least two semiconductor wafer substrates, a first dielectric layer formed in the first surface of the first semiconductor substrate and a patterned conductive interconnecting layer disposed on each first dielectric layer. And a patterned second dielectric layer formed on each patterned conductive interconnecting layer define a plurality of openings in each patterned conductive interconnecting layer. A conductive adhesive layer is filled in each first opening. In addition, the partial semiconductor wafer substrate was removed from the second surface of one of these two semiconductor wafer substrates to form a plurality of openings under the second surface. Then, a thermo-electric material is disposed in each first opening of any semiconductor wafer substrate and contacted with the conductive adhesive layer. Finally, the two semiconductor wafer substrates were attached together by way of flip-chip bonding, and the thermo-electric material structure is contacted with each first opening of each semiconductor wafer substrate.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The following is the detailed description of the present invention, which describes a method of fabricating an integral device of a biochip integrated with micro thermoelectric elements and the apparatus, but the detailed structure composition and the operating theory are not discussed. The portions relating to the conventional techniques are briefly described, and the parts of the drawings are not proportionally drafted. While embodiments are discussed, it is not intended to limit the scope of the present invention. Except expressly restricting the amount of the components, it is appreciated that the quantity of the disclosed components may be greater than that disclosed.

Figure 1A:
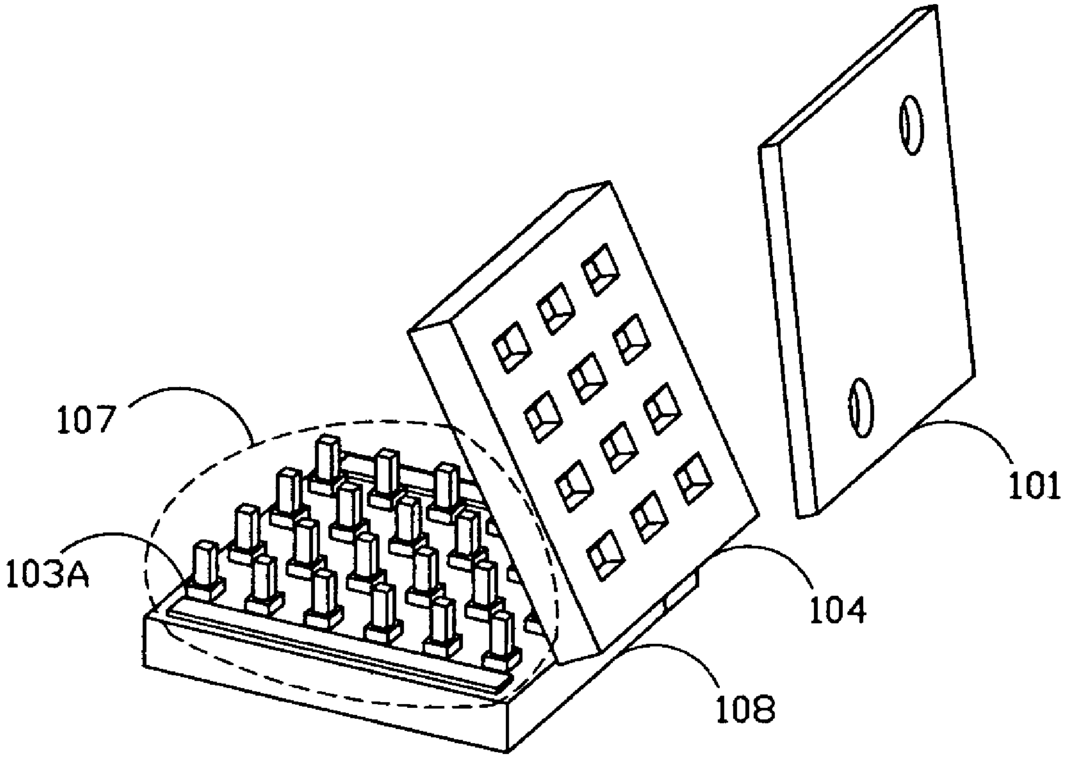
FIG. 1A illustrates a structure view of non-disposable micro concave chamber-type thermoelectric PCR device.
Figure 1B:
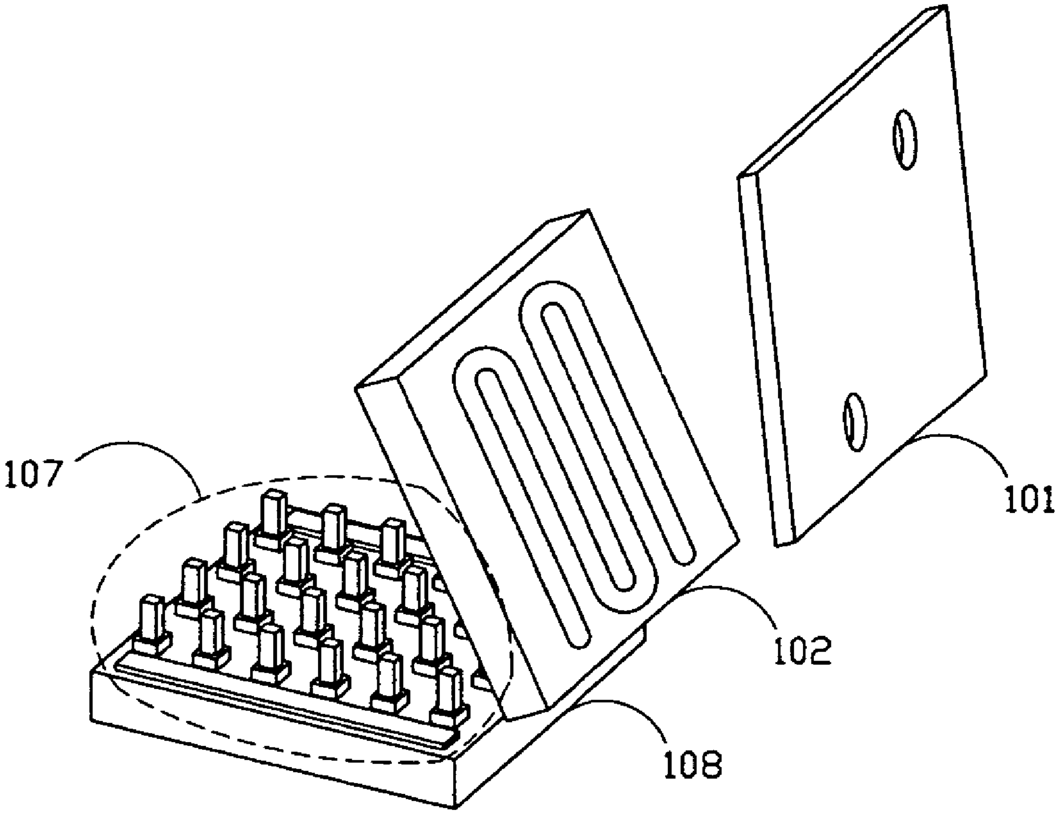
FIG. 1B illustrates a structure view of a structure view of non-disposable micro concave continuous-flow thermoelectric PCR device.
Figure 1C:
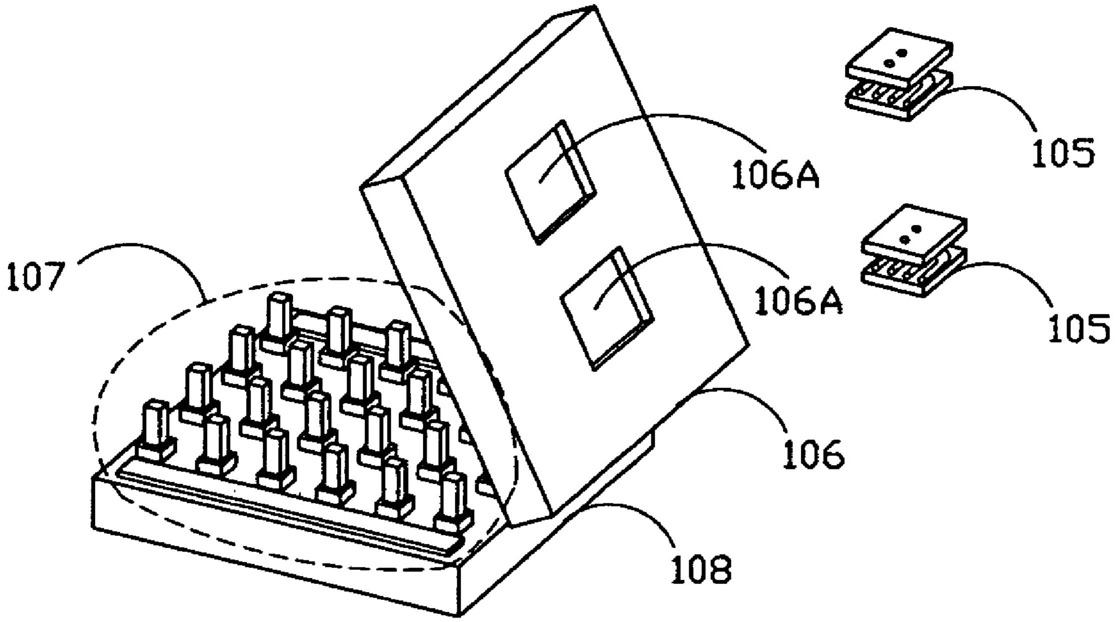
FIG. 1C illustrates a structure view of disposable micro non-concave thermoelectric PCR device.

According to the fabricating method and structure of the present invention, the applications can be used in disposable or non-disposable micro concave (non-concave) thermo-electric PCR chips. The following is the simple description of those models. At first, as shown in FIG. 1A, it is a structure view illustrating non-disposable micro concave chamber-type thermo-electric PCR device, which includes a glassed cover 101, a substrate 104 with chamber, and P-type or N-type thermo-electric material 107 fixed in the substrate 108. The concave 103A is used to put micro thermo-electric element. FIG. 1B is a structure view illustrating a non-disposable continuous-flow thermo-electric PCR device. The different to the FIG. 1A is that a reactive flow channel substrate 102 is included in FIG. 1B. FIG. 1C is a structure view illustrating the disposable micro concave thermo-electric PCR device, which includes a disposable PCR chip 105, a substrate 106 with a concave 106A being able to input a disposable PCR chip 105, and P-type or N-type thermo-electric material 107 fixed in the substrate 108.

Figure 2:
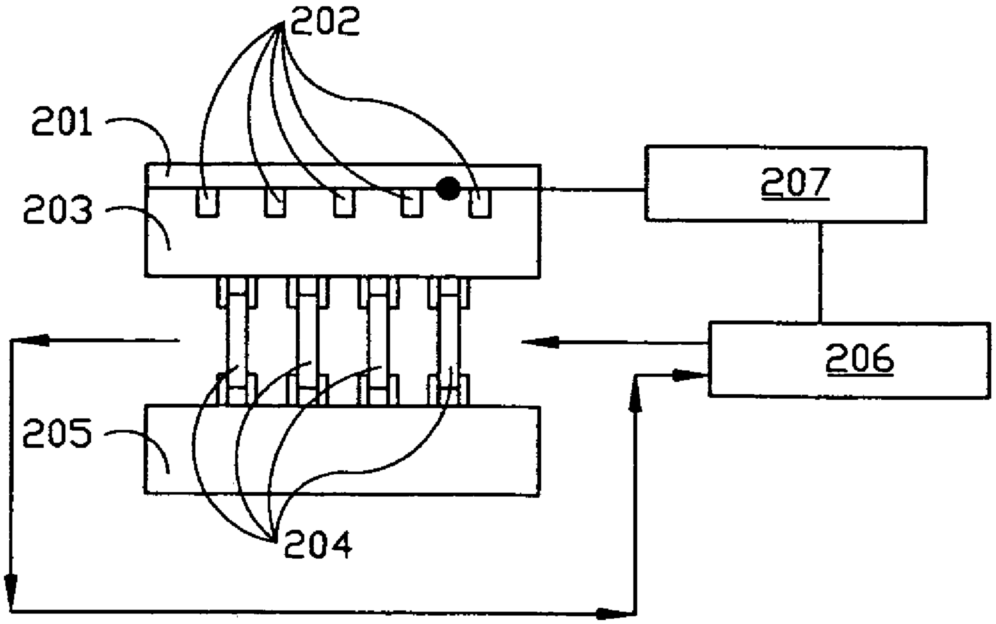
FIG. 2 illustrates a view of a thermoelectric PCR device integrating the temperature sensor and the temperature control module.

Besides, in another embodiment of the present invention, excepting to integrate the micro thermo-electric element and the PCR chip, it is further added a temperature sensor, such as a thermal couple, in the back of the substrate and also connected to a temperature feedback control system. A faster and more stable method in the PCR detection can reach the reactive temperature situation or process the control of the different temperature ranges. FIG. 2 is a view illustrating that the micro thermo-electric device is integrated with the temperature sensor and the temperature control module which includes a glassed cover 201, a first substrate 203 with a plurality of chambers 202, and a second substrate 205 with P-type or N-type thermo-electric material 204. Except those units described above, the chamber 202 can be connected to a temperature sensor module 207, and the temperature sensor module 207 is used to sense or detect the temperature of the fluid or the chip within the chamber 202. Moreover, a temperature control module 206 can be connected to the P-type or N-type thermo-electric material 204 and the temperature sensor module 207. The temperature control module 206 can adjust supplying or absorbing the energy of the P-type or N-type thermo-electric material 204 by the temperature data of the temperature sensor module 207.

Figure 3A:
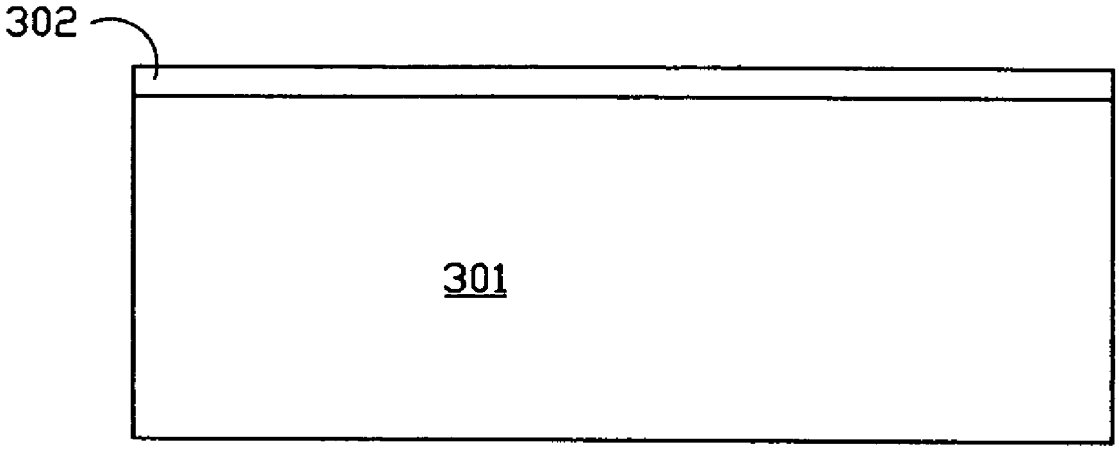
FIGS. 3A-3C illustrate cross-sectional views of producing the need of the micro thermoelectric bio structure of the wafer structure in one embodiment of the present invention.
Figure 3B:
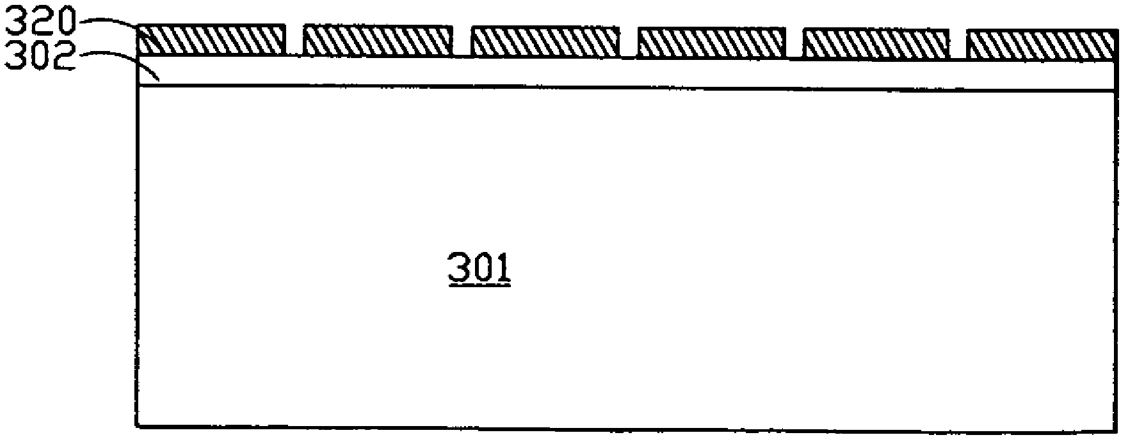
Figure 3C:
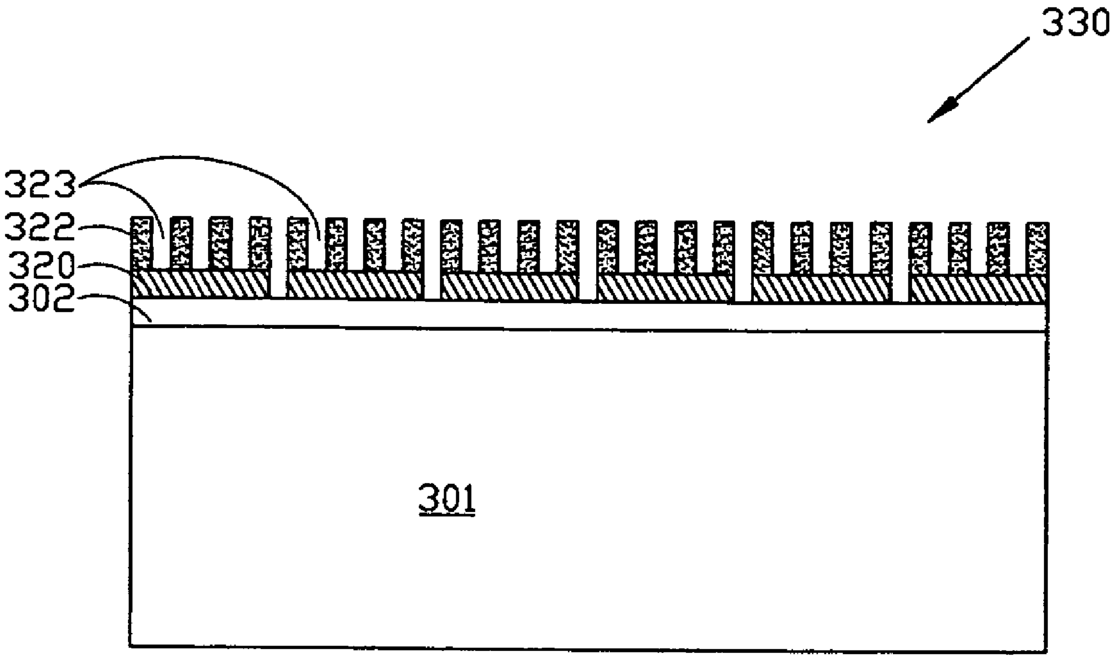

FIGS. 3A to 3C are the cross-sectional view drawings illustrating the wafer structures which are needed to produce the micro thermo-electric bio-structure. Referring to FIG. 3A, a dielectric layer 302 is formed in one surface of the semiconductor substrate 301. In one embodiment, the semiconductor substrate 301 can be a silicon wafer, or the wafer with other materials included silicon inside, glass, plastic or other materials being able to etch. The dielectric layer 302, such as a $SiO_2$ formed in a normal depositing way, is about 12000 A (Angstrom) thick and is used to be electrically insulated. The conductive layer and the photoresist layer (not shown) are formed on the dielectric layer in proper order. The parts of the conductive layer can be removed after the step of the normal photolithography and etching, and the conductive layer 320 is formed on the dielectric layer 302. Now referring to FIG. 3B, in one embodiment, the conductive layer can be formed one or many layers structure by one or many steps, such as electroplating Ti, Cu and Ni in proper order and forming a Ti/Cu/Ni metal or an alloy layer, and the conductive layer 320 is made by the metal etching method to be the electrical interconnection of the thermo-electric material. Moreover, in the application of the integrated temperature control module, the patterned conductive layer 320 can be formed to be the conductive wire, which is connecting to the outside, and is electrically connected to the external temperature control module. Besides, the position and the quantity of the conductive wires can be used to achieve the purpose to divide the temperature ranges in the semiconductor substrate 301.

Thereafter, another dielectric layer covering the conductive layer 320 and the exposed dielectric layer 302 are used to process the step of the photolithography and etching to remove partial dielectric layer and the insulated side wall 322 is formed in the conductive layer 320. Finally, the wafer structure 330 was completed. Referring to FIG. 3C, in one embodiment of the present invention, the dielectric layer forming the insulated side wall 322 can be the photosensitive layer and uses the normal photolithography to process patterning and form the insulated side wall 322, such as photosensitive epoxy high polymer layer (material). The patterned insulated side wall 322 defines a few of openings in the conductive layer 320. Moreover, the insulated side wall 322 can be used to help firming the thermo-electric material in the following manufacture and there is no limit in the geometrical shape. And the position of the insulated side wall 322 is not only in the top of the conductive layer, but also can be extended to the surrounding area of the conductive layer 320 on the dielectric layer 302.

Figure 3D:
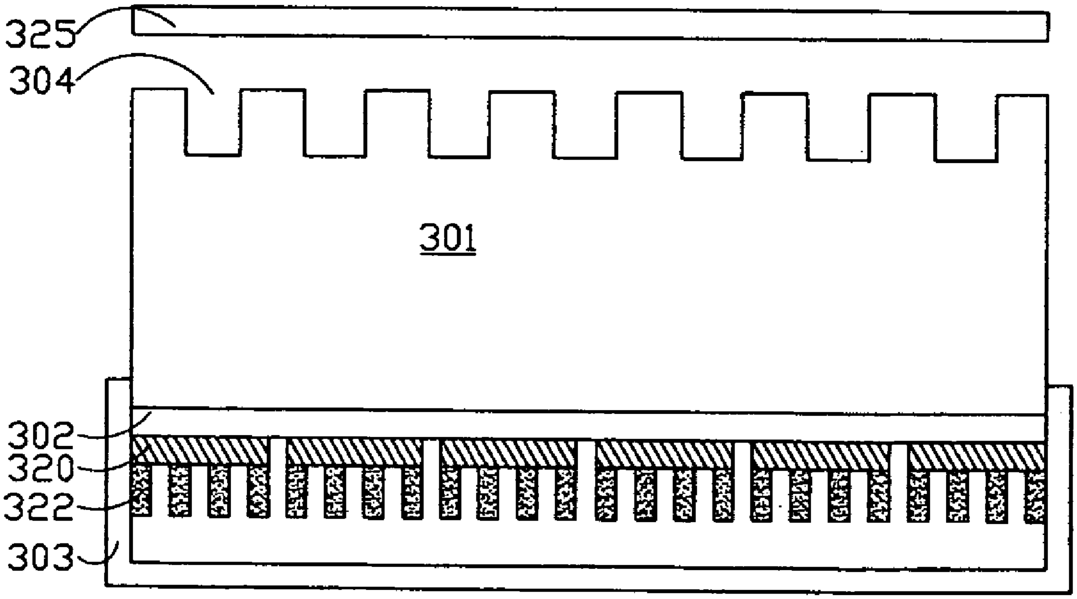
FIG. 3D-3E illustrate cross-sectional views of producing the reactive-flow substrate from the wafer structure in one embodiment of present invention.
Figure 3E:
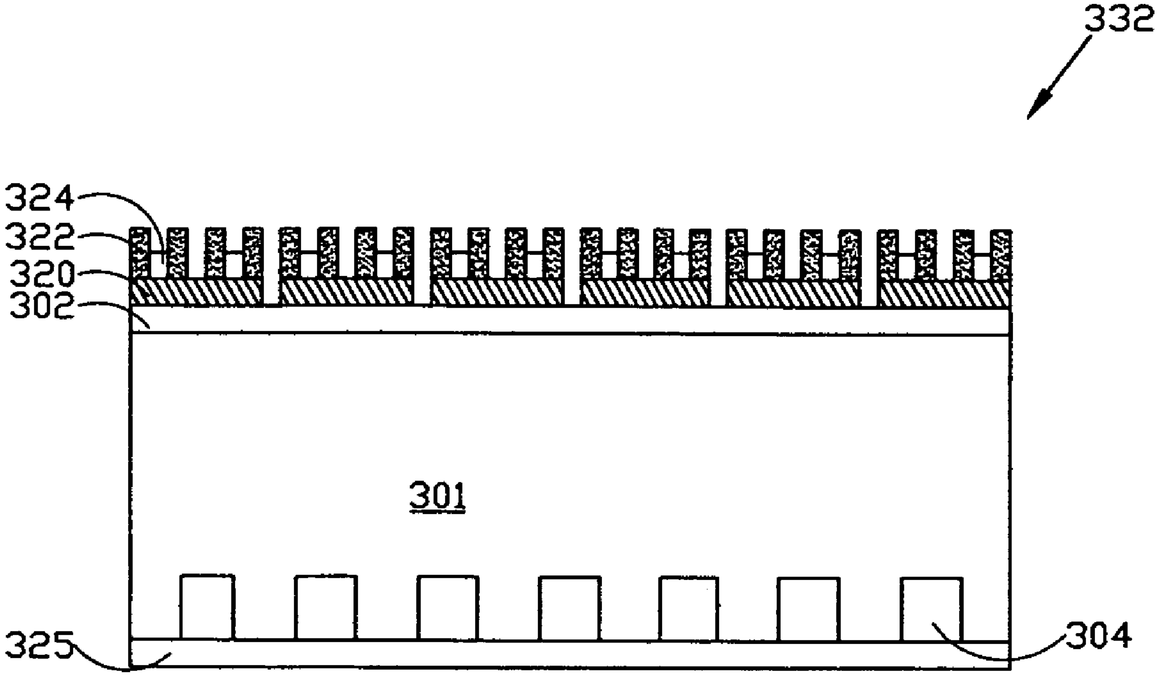

The wafer structure 330 can be used to produce the reactive flow substrate and the thermo-electric structure substrate in the embodiment of the present invention. FIG. 3D to 3E are the cross-sectional view illustrating the wafer structure 330 produces the reactive flow substrate 332. Referring to FIG. 3D, the protected cover 303 can be used to protect one surface with the structure of the insulated side wall in the wafer structure 330 and a few of chambers 304 can be made by using the other surface (in the back of wafer) of the semiconductor substrate 301 after turning upside down. In the embodiment of the present invention, because of the material properties of the semiconductor substrate 301, the normal photolithography and etching method can be used to produce a few of openings for the use of the chambers 304. Moreover, by the need of the design, the chamber 304 can be the isolated opening disposed on the semiconductor substrate 301 or the continuous concave circles the semiconductor substrate 301. The shape or depth can be changed by the need of the design, for example rectangular shape, trapezoid shape, semicircle shape and so on. Besides, a glassed cover 325 can be disposed in the chamber 304 by using the anodic bonding technique to firmly put the glassed cover 325 in the chamber 304. In the post manufacture and the application, the glassed cover 325 can protect the chamber 304 from polluting or damaging the sample, which is inside the chamber 304. The shape and the length of the chamber 304 made by one embodiment of the present invention can be changed by the need of the design, such as rectangular shape, circle shape, or a continuous curve path, which can be applied to the continuous-flow PCR bioreaction, or both of them can be disposed in the same semiconductor. When the continuous-flow PCR bio reacted, the chamber 304 can be externally connected to the power module or device which is needed when the reactive fluid flows to the chamber 304, such as bumper and so on. Moreover, the chamber 304 can be used to be the disposable or not-disposable micro thermo-electric PCR chips, where the non-disposable micro concave thermo-electric PCR chip can be used to be fluid channel or storage and the disposable one can be used to put the PCR chip. The chip had been reacted can be taken from the chamber 304. In addition, in another embodiment, the sensor can be disposed in the surrounding area of the chamber 304, for example the electrical coupling element (not shown) is able to be connected to the outside to detect the temperature of the chamber 304, but the present invention is not limited in the previous description.

Referring to FIG. 3E, the adhesive 324 is filled in the opening 323 between the insulated side wall 322 to cover partial conductive layer 320. In the present embodiment, the adhered material, such as solder paste, can be filled in the opening 323 by the way of metal board print and can be firmly connected to the thermo-electric material in the post manufacture. Because the insulated side wall 322 can be used to position in the post manufacture, the height of the filled opening of the adhesive 324 is lower than the insulated side wall 322. Therefore, the production of the reactive flow channel substrate 332 is completed.

Figure 3F:
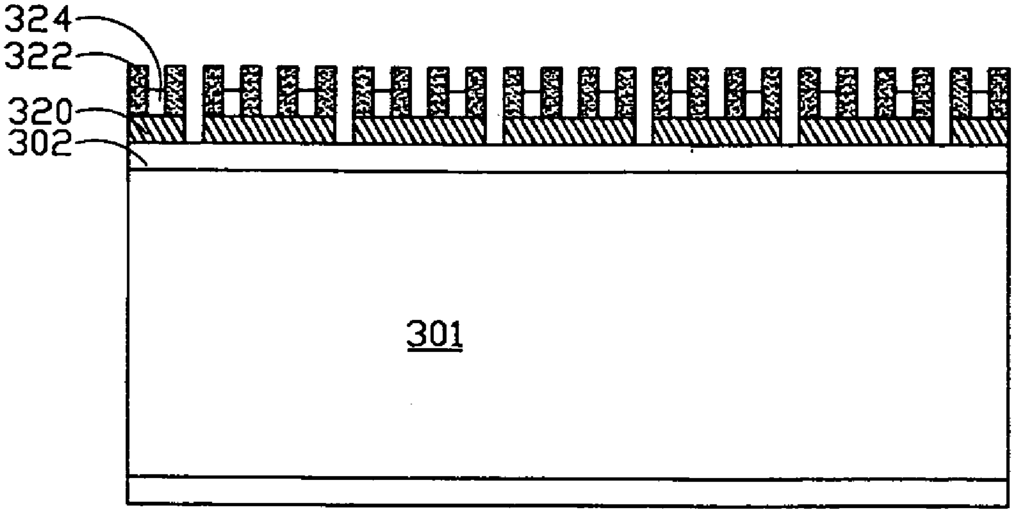
FIG. 3F-3G illustrate cross-sectional views of producing thermo-electric structure substrate from wafer structure in one embodiment of present invention.
Figure 3G:
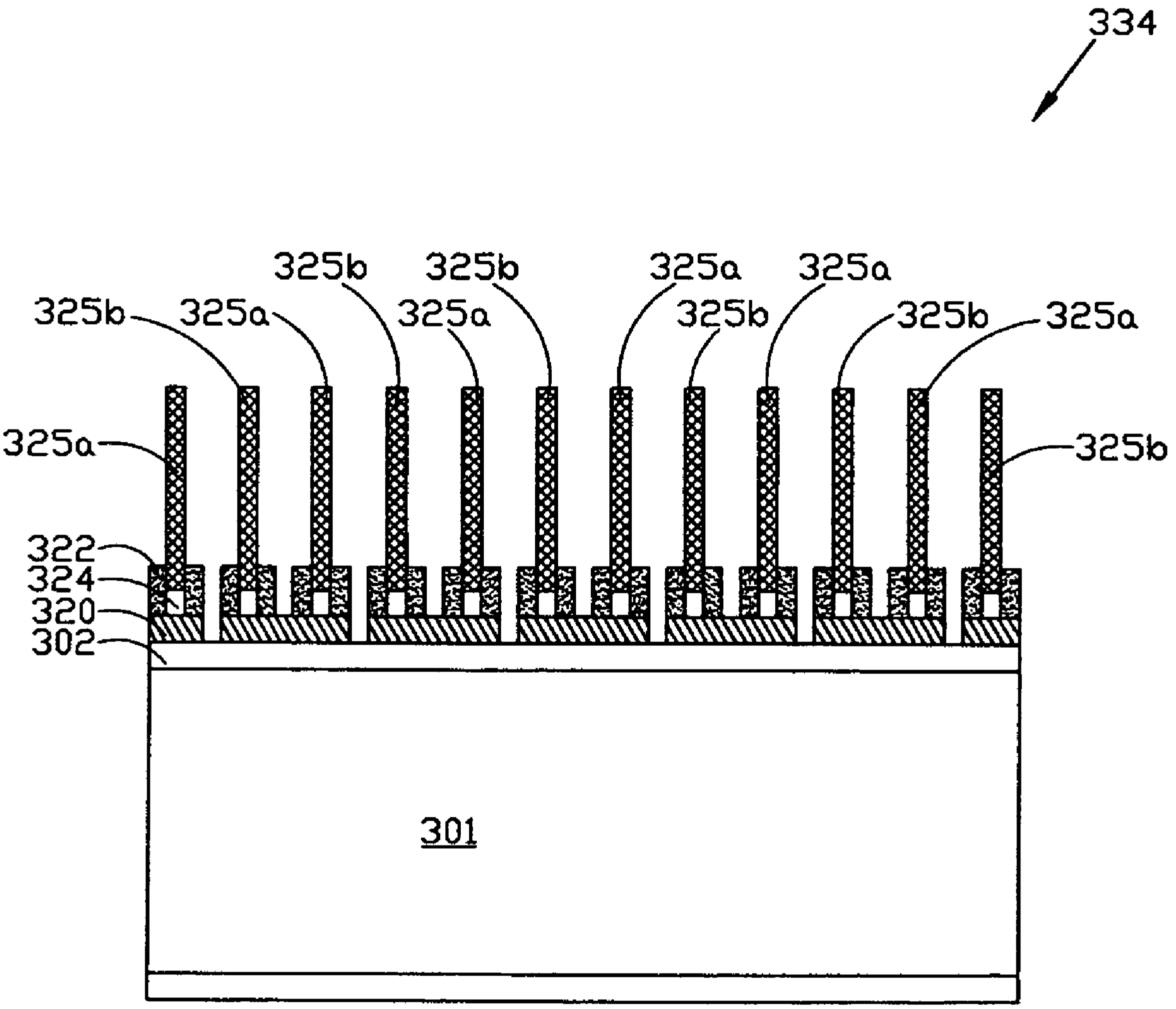

On the other hand, FIGS. 3F to 3D are the cross-sectional views illustrating the thermo-electric structure substrate made by the wafer structure 330 in one embodiment of the present invention. Referring to FIG. 3F, the drawing is similar to FIG. 3E, the adhesive 324 is filled in the opening 323, which is in the insulated side wall 322 of the wafer structure 330 and is covered with the parts of the conductive layer 320. Then, the assistant position of the insulated side wall 322 help the thermo-electric materials 325*a* and 325*b* to disposed in the adherent material 324. Now referring to FIG. 3G, the drawing is the complete production of the thermo-electric structure substrate 334. In the present embodiment, the thermo-electric material 325*a* and 325*b* are respectively being the P-type bismuth/telluric alloy semiconductor material provided the electrical holes and the N-type bismuth/telluric semiconductor material provided the electrics, and both of them can be a set of thermocouple.

Figure 4:
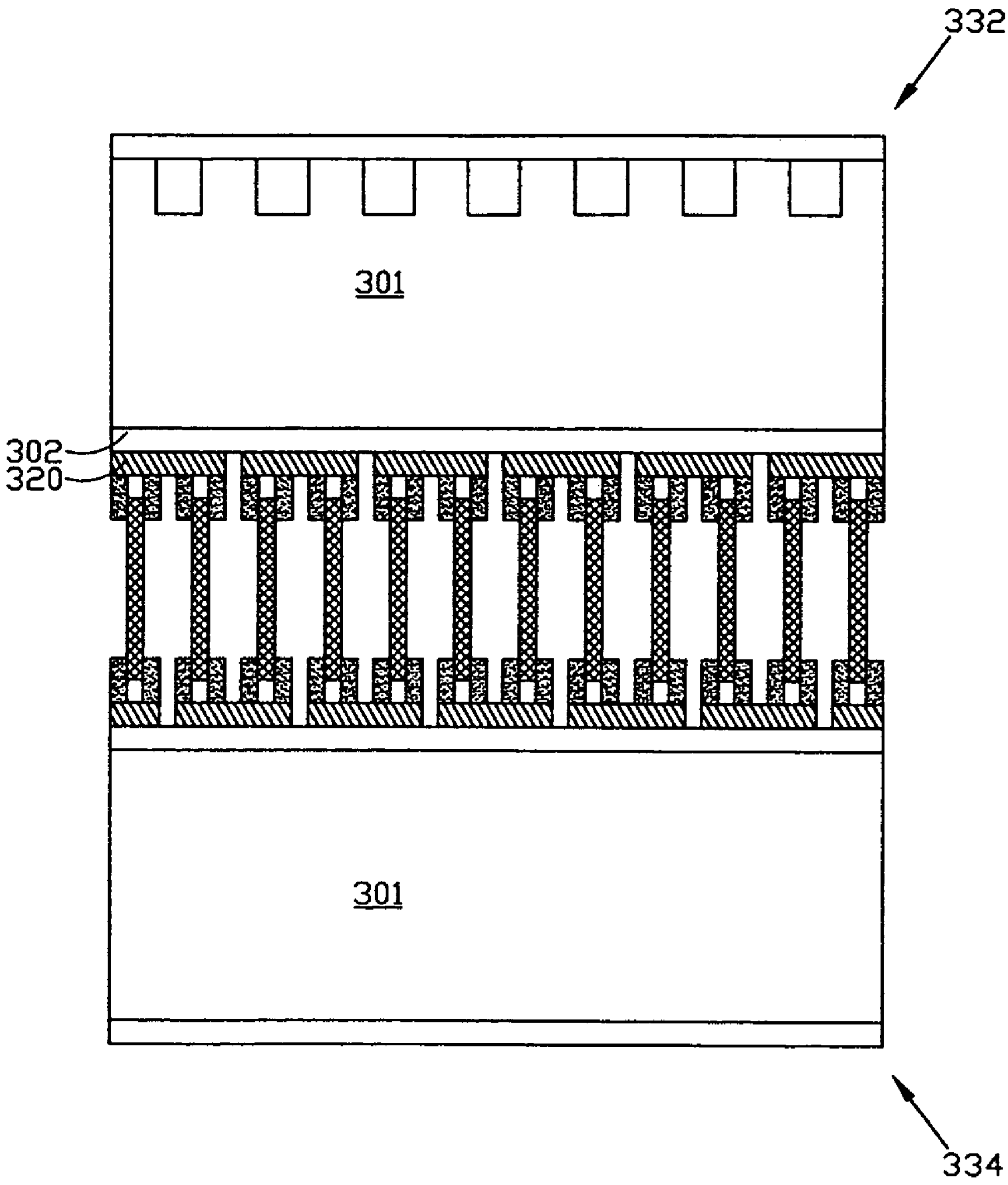
FIG. 4 illustrates a cross-sectional view of assembling a reactive-flow substrate and a thermoelectric structure substrate in one embodiment of the present invention.
Figure 5:
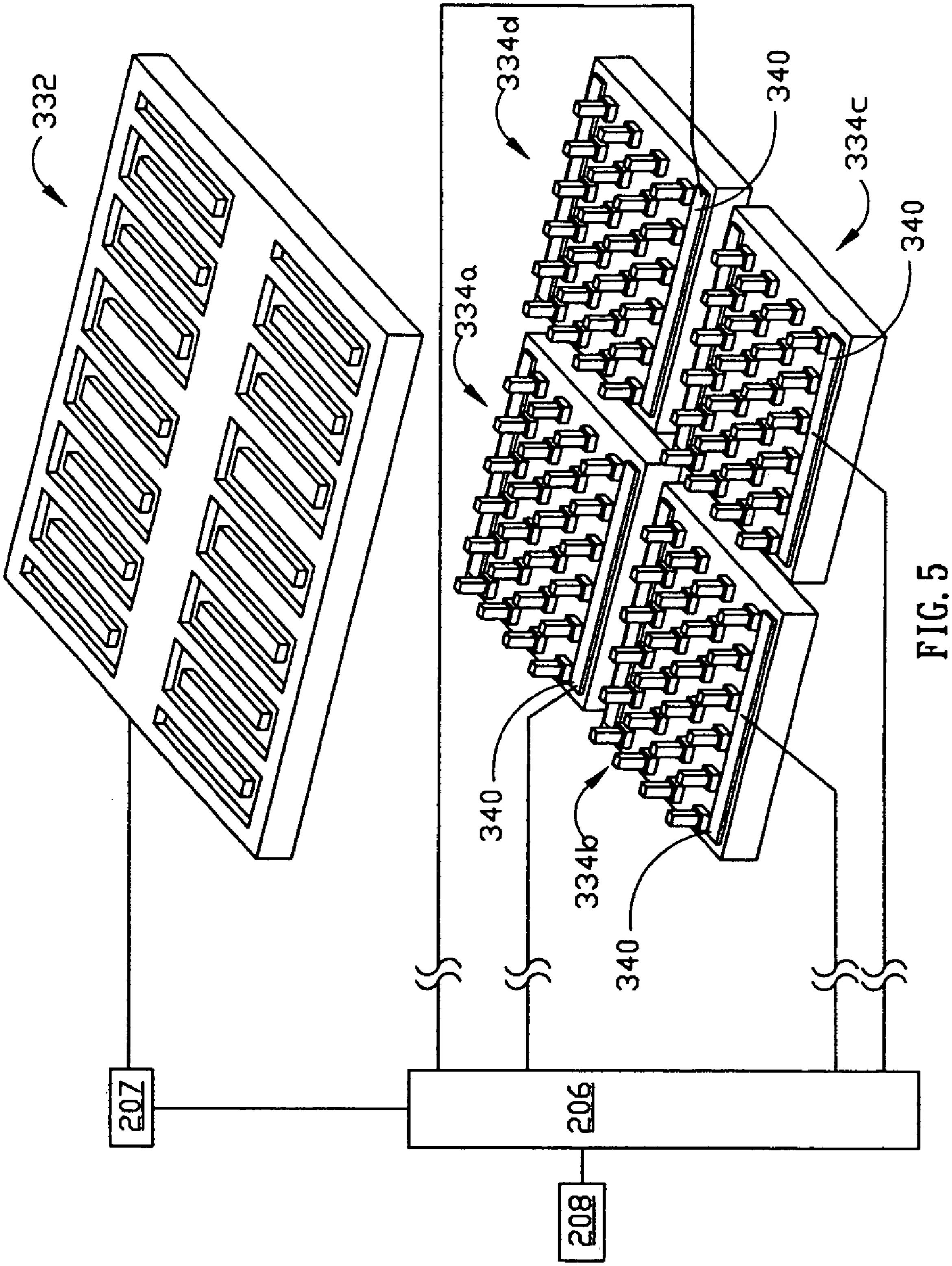
FIG. 5 illustrates a block and 3-D view of an integrating structure in one embodiment of the present invention.

FIG. 4 is the cross-sectional view illustrating the assembly of the reactive flow channel substrate 332 and the thermo-electric structure substrate 334 in one embodiment of the present invention. In present embodiment, the flip-chip bonding is used to align the reactive flow channel substrate 332 and the thermo-electric structure substrate 334, and reflow them to complete the micro thermo-electric bio-structure in the present invention. FIG. 5 is a 3-D view illustrating parts of the integrated temperature sensor and the temperature control module in one embodiment of the present invention. In the present embodiment, the thermo-electric structure substrate can be divided into 4 temperature parts: 334*a*, 334*b*, 334*c*, and 334*d*. Each of the temperature parts 334*a*, 334*b*, 334*c*, and 334*d* has his own conductive wire 340, which can be connected to the temperature control device 206. Moreover, the reactive flow channel substrate 332 can have some sensors (not shown) to sense the corresponding locational temperature in the different temperature parts 334*a*, 334*b*, 334*c* and 334*d* in the thermo-electric structure substrate to the temperature sensor device 207. According to the description above, the temperature control device 206 can accord to the information of the temperature sensor device 207 and utilize the power device to control the different temperature of the thermo-electric structure substrate 334*a*, 334*b*, 334*c* and 334*d*.

Besides, it should be noted that the PCR chip is used to be the example in the embodiment of the present invention, the other kinds of micro thermo-electric temperature control of the biochip can be used based on the present invention. It is not necessary to describe the detail in herein. According to the description above, a structure integrated the bio-chamber and the thermo-electric element includes: a chamber substrate module having a first substrate, a cover, and at least one chamber, wherein said first substrate has a first up surface and a first down surface, wherein said chamber is below said first up surface and said cover is disposed above said first up surface; a second substrate having a second up surface and a second down surface, wherein said second up surface is faced to said first down surface; and a plurality of thermo-electric modules, comprising: a plurality of thermo-electric material structures disposed between said second up surface and said second up surface; an insulated side wall fixed in each of said electrical interconnecting layer and disposed in one side wall of each of said thermo-electric material structure; and a conductively adhesive being between any of said electrical interconnecting layer and each of said thermo-electric material structure.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An apparatus for fabricating a micro thermo-electric bio element, comprising:

- a chamber substrate module having a first substrate, a cover, and at least one chamber, wherein said first substrate has a first up surface and a first down surface, wherein said chamber is below said first up surface and said cover is disposed above said first up surface;
- a second substrate having a second up surface and a second down surface, wherein said second up surface is faced to said first down surface; and
- a plurality of thermo-electric modules, comprising:
  - a plurality of thermo-electric material structures disposed between said second up surface and said first down surface;
  - an insulated side wall fixed in each of a plurality of electrical interconnecting layers and disposed on a side wall of each of a plurality of thermo-electric material structures; and
  - a conductively adhesive layer disposed between at least one of said electrical interconnecting layers and said thermo-electric material structures.

2. The apparatus of claim 1, wherein said first substrate and said second substrate are silicon wafer.

3. The apparatus of claim 1, wherein said cover is a glassed cover.

4. The apparatus of claim 1, wherein said chamber comprises a continuous bending concave disposed in said first up surface.

5. The apparatus of claim 1, wherein said chamber has a plurality of openings separately disposed in said first up surface.

6. The apparatus of claim 1, wherein said plurality of thermo-electric material structure is a plurality of P-type bismuth/telluric alloy semiconductor material.

7. The apparatus of claim 1, wherein said plurality of thermo-electric material structure is a plurality of N-type bismuth/telluric alloy semiconductor material.

8. The apparatus of claim 6, wherein each of said P-type bismuth/telluric alloy semiconductor material is closed to each of said N-type bismuth/telluric alloy semiconductor material.

9. The apparatus of claim 1, wherein the main material of each of said electrical interconnecting layer is Ti/Cu/Ni.

10. The apparatus of claim 1, wherein the material of said insulated side wall is photosensitive polymer layer.

11. The apparatus of claim 1, wherein said conductively adhesive material is a solder.

* * * * *